March 27, 1956   W. E. O'SHEI   2,739,339
WINDSCREEN WIPERS
Filed July 26, 1951

Inventor
William Edward O'Shei
By Boyle & Blair
Attorney

United States Patent Office 2,739,339
Patented Mar. 27, 1956

2,739,339

WINDSCREEN WIPERS

William Edward O'Shei, London, England

Application July 26, 1951, Serial No. 238,604

Claims priority, application Great Britain July 28, 1950

10 Claims. (Cl. 15—255)

The present invention relates to windscreen wipers, and to connectors for attaching the wiper blade to the arm of a windscreen wiper, of the type wherein the wiper blade is mounted so as to be angularly movable with respect to the radial direction of the wiper arm, and wherein resilient means are provided for normally holding the wiper blade at any desired angle relatively to the wiper arm and in such a manner that the blade can be twisted into a position deviating from its normal position against the action of the resilient means. Usually, the wiper blade is normally held parallel to the wiper arm by the resilient means. Such a mounting of the blade enables the arc of wiping to be increased without correspondingly increasing the arc swept by the wiper arm, and also enables the blade to be parked close against the edge of the windscreen frame. This is achieved by arranging that that end of the wiper blade which is nearer to the horizontal frame member which is approached by the blade near each end of the stroke of the wiper arm, is engaged and arrested by that frame member so that as the arm completes its stroke, the mounting of the blade permits the blade to pivot about its arrested end and thus twist out of its normal position relatively to the arm, against the action of the resilient means, towards that frame member. When the blade is twisted thus, it is evident that the reaction exerted by the resilient means tending to restore the blade to its normal position is prevented from coming into play, when the wiper is in operation, until the wiper arm reverses its motion at the end of its stroke, or, when the wiper is not in operation, by whatever means may be provided for holding the blade in the parked position, such means in the case of a suction-operated wiper being the operating suction power.

Now, when a wiper is mounted with its rotation axis below the bottom of the windscreen, as is current practice, when the windscreen is wet, the water squeegeed by the top part of the blade tends to run down its bottom part. When the windscreen is in an intermediate condition between wet and dry, as when the blade is wiping and drying a wet screen, the action of the top part of the blade in driving the squeegeed water down to the bottom part tends to dry the top part while the bottom part is still wet. Consequently, the bottom part, which is lubricated by the water, easily slides over the windscreen surface, whereas the top part, becoming dry, has a tendency to stick to the surface and thus lag behind the movement of the bottom part, so that the blade tends to twist out of its normal position relatively to the arm in the opposite direction to that which the blade is designed to be twisted (as earlier described) when the bottom end engages and is arrested by the bottom member of the windscreen frame.

This reverse twisting of the blade can be prevented by making sufficiently powerful for that purpose the above-mentioned resilient means provided for holding the blade in its normal position relatively to the arm, but this has the disadvantage of requiring more power and pressure from the wiper arm in order to twist the blade for increasing the arc of wiping near the end of the stroke of the arm, and also, in the case of a suction-operated wiper, when the suction supply is cut off when the engine of the vehicle is stopped, the power of the resilient means is sufficient to shift the blade from the parked position.

In accordance with the present invention, means are provided for restraining twisting of the blade relative to the arm, during the passage of the blade over the windscreen, in a direction reverse to that of the twisting which takes place at the end of the stroke for the purpose of increasing the arc of wiping.

According to another aspect of the invention, stop means is provided for preventing or restraining drag on the outer end of the blade from twisting the blade, relative to the arm, as it is moved over the windscreen but permitting twisting of the blade relative to the arm in a direction to increase the arc of wiping, said stop means reversing its direction of operation as the blade reverses its direction of movement.

The desired normal relative angular relationship between the wiper arm and the wiper blade may be maintained by spring means, such as a helical compression spring, acting on a pair of members which are movable relatively to each other to allow the blade to twist relatively to the arm, the relative movement of the two members from their normal relative positions causing deflection of the spring means which thus tends to restore the members to and maintain them in the desired normal relationship. An arrangement of this character forms the subject of copending application Serial No. 229,307, filed June 1, 1951, now Patent No. 2,701,891. In carrying out the present invention with any such arrangement, stop means are provided which are normally positioned to prevent the relative movement of the said two members, but is adapted to be shifted into a position where it no longer prevents such relative movement when the blade reverses its direction of movement at the end of its stroke.

Conveniently, the blade may be free to rock relative to the arm to a trailing position, as the blade is moved over the windscreen, and the stop means is reversed by the said rocking of the blade to the reverse trailing position as the blade reverses its direction of movement.

In one embodiment for carrying out the present invention, a connector is constructed as disclosed in the specification of the aforesaid application, either as part of the wiper arm or separately, with the following modification. The housing carried by the end of the wiper arm and pivoted on the ends of a rod carried by the two spaced members on the back of the blade between which the restoring helical compression spring is positioned encircling the rod as described in that specification has its longitudinal side walls extended downwardly towards the back of the blade sufficiently to provide an abutment at each side in the path of the pivotally movable one of the two spaced members, the other one of which is fixed on the back of the blade. The pivotal member is pivoted to the back of the blade by a pin and slot connection as described in the aforesaid specification, which allows the member not only to swing transversely with respect to the fixed member and the back of the blade, but also to tilt about its pivoted end upwardly from the back of the blade. The housing and rod can also tilt upwardly with the pivoted member, the housing tilting about the end of the rod journalled in the fixed member. The abutments thus formed by the housing operate independently of the spring to prevent twisting movement of the above-mentioned movable member that would be caused by any tendency for the blade to twist with respect to the connector while the blade is normally sweeping across the windscreen. The depth of the abutments is so made that they will lie in the path of twisting movement of the movable member and prevent the movable member from swinging outwardly of the housing in response to any tendency of the top part of the blade to lag behind the bottom part.

To permit swinging of the blade to increase the arc of wiping, the abutment at the leading edge may move clear of the movable member by virtue of the rocking of the blade to the trailing position as mentioned above. Such an arrangement necessitates the housing pivoting about its end nearer the axis of rotation of the wiper arm, and in this respect the general arrangement differs from that described in the specification of the copending application just referred to.

Alternatively the housing may pivot about its end more remote from the axis of rotation of the wiper arm and the above-mentioned lifting of the housing relied upon to cause the abutment to clear the movable member to permit swinging of the blade. Thus, when the bottom end of the blade is arrested by the windscreen frame near the end of the wiper arm stroke, the continued movement of the arm causes the housing and movable member to tilt upwardly from the back of the blade in the manner earlier described, so that by virtue of the spacing between the respective points about which the housing and movable member tilt, the housing rises more than the movable member and sufficiently for the abutment to clear the movable member and allow it to twist and permit the blade to twist about its arrested bottom end for increasing the arc of wiping.

Instead of deepening the longitudinal side walls of the housing, the movable member may be provided with an extension or extensions adapted to cooperate in the described manner with the side walls of the housing. Alternatively, a combination of both features may be employed, viz., by deepening the side walls of the housing as well as providing the movable member with such extension or extensions.

The invention is illustrated by way of example in the accompanying drawing, in which.

Figure 1:
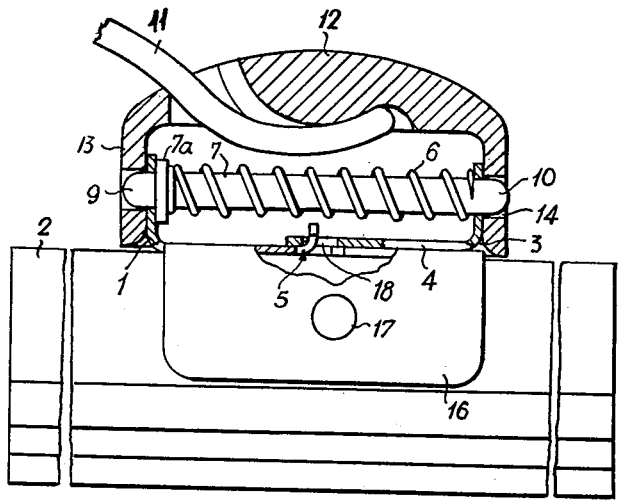
Fig. 1 is a side elevation showing partly in section one form of connector with part of the wiper blade and arm.
Figure 2:
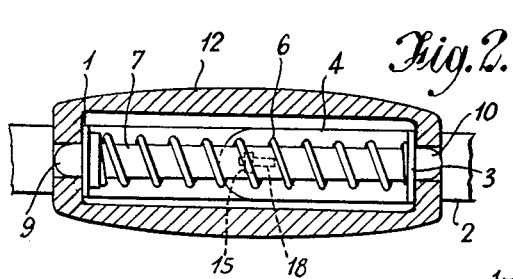
Figs. 2 and 3 are plan views respectively showing the device in its normal position and in a deflected position, and Fig. 4 in an exploded perspective view showing the attachment of the movable ear.
Figure 4:

Referring now to the drawing, the connector comprises an apertured ear 1 extending upwardly from the back of the wiper blade 2, and a second apertured ear 3 spaced therefrom and forming one limb of an L-shaped member of which the other limb 4 extends towards the first ear and is pivotally connected at 5 to the wiper blade so that the second ear can swing transversely with respect to the back of the blade. Between the ears is arranged a helical compression spring 6, which is held in position under compression between the ears 1 and 3 by a rod 7 which extends through the bore of the spring 6 and the apertures 8 in the ears. The ends 9 and 10 of this rod extend beyond the ears and form pivots for a member forming or carried by the end of the wiper arm 11. Preferably the member carried by the end of the wiper arm comprises a hollow housing 12, conveniently made by die-casting, which fits over and encloses the ears 1 and 3, the end walls 13 of the housing being apertured at 14 to receive the projecting ends of the rod 7.

Figure 3:
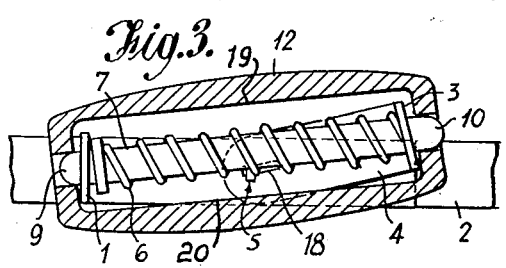

With the construction described, the housing 12 may be twisted relative to the longitudinal direction of the blade 2, by swinging it about the end 9 of the rod beyond the fixed ear 1 and thereby moving the movable ear 3 transversely with respect to the blade 2 as shown in Fig. 3. This transverse movement of the movable ear reduces the distance between the ears 1 and 3 and thus further compresses the spring 6, which tends to restore the housing 12 into its position in alignment with the blade 2 when the pressure which is exerted to twist the blade relative to the arm 11 is removed.

Preferably the movable ear 3 is pivotally connected to the blade 2 or fixed ear 1 by a slot or like connection which permits the spacing between the ears to automatically adjust itself to the distance between the inner surfaces of the end walls 13 of the housing 12. Conveniently the fixed ear 1 is formed integrally with a channel-shaped metal stamping 16 which is adapted to be fitted over and secured, as by a rivet 17, to the back of the wiper blade 2, such that the ear 1 extends upwardly from the back of the blade 2. In order to connect the second ear pivotally to the back of this channel, a pivot pin, formed by stamping up a T-shaped tongue 15 from the channel member 16, is arranged to engage with its neck a longitudinal slot 18 in the limb 4 of the movable ear 3. Alternatively the pivot pin may be formed for example by a rivet which passes through the back of the channel member and the slot in the limb of the L-shaped member constituting the movable ear. Thus the spring pressure urges the movable ear 3 into contact with the inner surface of the adjacent end wall of the housing 12 and also urges the other end wall of the housing into close contact with the outer surface of the fixed ear 1. This holds the two parts in close contact and prevents rattle. Furthermore, since the outer surfaces of the ears 1 and 3 and the inner surfaces of the end walls are conveniently made flat, the slotted connection permits the movable ear to move slightly towards the fixed ear when the housing is twisted about the fixed ear, which twisting, as can be readily seen in Fig. 3, takes place about an edge of the ear 1, and not about the centre thereof, thus producing a further reduction of the distance between the two ears 1 and 3 and consequently further compression of the spring 6.

As previously mentioned, the housing preferably comprises a hollow die-casting and may be provided with means for attaching it to the wiper arm. For example, if the arm 11 is provided with a curved end, the top wall of the housing may be apertured to receive the curved end of the arm. The inner surface of the top wall may be shaped to conform with the curvature of the end of the arm.

Figure 5:
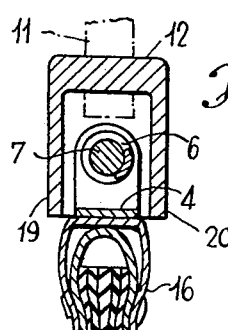
Fig. 5 is a cross-sectional view showing the blade normal to the arm.
Figure 6:
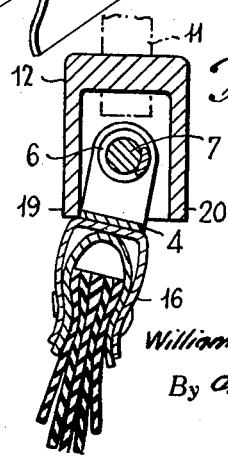
Fig. 6 is a similar view showing the blade rocked to a trailing position relative to the arm.

As will be seen from Fig. 3, to permit the housing 12 to twist relative to the blade 2, or in other words to permit the blade 2 to twist relative to the arm 11, the inner end of the pivoted member 4 must pass outwardly beyond the inner edge of the housing 12. It will be noted from Fig. 5, however, that the side walls 19 and 20 of the housing 12 straddle the member 4 so as normally to prevent such outward movement of the member 4. However, the blade is free to rock about the rod 7 to a trailing position relative to the housing as the blade is moved over the surface of the windscreen. Such a trailing position of the blade is shown in Fig. 6 in which it is assumed that the blade is being moved to the right in the figure. The leading edge of member 4 is thereby moved clear of the adjacent side wall 20 of the housing so as to permit the movement of member 4 outward beyond the inner edge of the wall 20 as shown in Fig. 3. In this figure it is assumed that member 12 is being moved downwardly, as viewed in the figure, by the arm 11 moving about its axis of rotation to the left of the figure, the left hand end of the blade having, in known manner, engaged the horizontal frame member of the windscreen to cause the displacement of the blade relative to the arm to increase the arc of wiping. During the movement of the arm and blade in this direction, any twisting of the blade in the reverse direction relative to the arm, by reason of drag of the outer or right hand end of the blade as viewed in Fig. 3, is prevented by the pivoted member 4 abutting against the opposite wall 19 of the housing 12 as clearly shown in Fig. 6.

As the blade reverses its direction of movement at the end of its stroke, it rocks about the rod 7 to the reverse trailing position so that the pivoted member 4 now abuts against the inner edge of side wall 20 to prevent drag of the outer end of the blade, while permitting member 4 to move outwardly beyond the inner edge of side wall 19 as the blade approaches its other extreme position and engages the horizontal frame of the windscreen.

Figure 7:
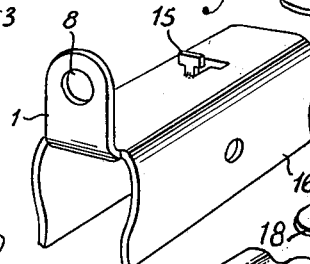
Fig. 7 is an exploded perspective view showing a modified construction of the moveable ear and the channel member.
Figure 7:
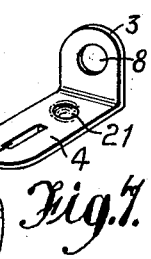

It will be noted that member 4 is free to rock about the pivot point 5 upwardly away from the blade, carrying with it the rod 7 and housing 12. In a modification, therefore, the arm 11 is reversed in position to that shown in Fig. 1 so that the housing pivots about the ear 1 at the end remote from the axis of rotation. With such a construction, when the bottom end of the blade is arrested by the windscreen frame near the end of the wiper arm stroke, the continued movement of the arm causes the housing and movable member 4 to tilt upwardly from the back of the blade in the manner just described, so that by virtue of the spacing between the respective points about which the housing and member 4 tilt, the housing rises more than member 4 and sufficiently for the side walls 19 and 20 to clear the member 4 and allow it to twist and permit the blade to twist about its arrested bottom end for increasing the arc of wiping. If desired, as shown in the modification of Fig. 7, member 4 may be formed with a protuberance on its underside, formed for example by the indentation 21, which engages in a slot or recess 22 in the back of member 16 so as to prevent the relative twisting of the blade during its stroke, the protuberance being disengaged, at the end of the stroke, from the slot or recess by the lifting action just described.

The invention is not limited to the particular embodiment described, as it may be applied to any construction of wiper, or wiper blade, or device for attaching a wiper blade to a wiper arm, which will permit the wiper blade to twist with respect to the wiper arm to increase the arc of wiping.

What I claim is:

1. In a windscreen wiper of the type wherein the blade is mounted so as to be angularly movable with respect to the radial position of the wiper arm to increase the arc of wiping by the inner end of the blade engaging a fixed member at the end of its stroke, a wiper blade and an actuating arm carrying said blade, means pivotally connecting said blade to said arm for angular movement relative to the arm and for rocking movement to a trailing position relative thereto, and stop means operating between the arm and blade when the latter are in their normal relative position and acting to restrict drag on the outer end of the blade from twisting the blade relative to the arm as the blade is moved over the windscreen but permitting advance of the outer end of the blade relative to the arm, the direction of operation of said stop means being reversed by the rocking of the blade to the opposite trailing position as the blade reverses its direction of movement at the end of its stroke.

2. In a windscreen wiper of the type wherein the blade is mounted so as to be angularly movable with respect to the radial position of the wiper arm to increase the arc of wiping by the inner end of the blade engaging a fixed member at the end of its stroke, a wiper blade member and an actuating arm member carrying said blade member, means pivotally connecting said blade member to said arm member for angular movement relative to the arm member and for rocking movement to a trailing position relative thereto, a pair of laterally spaced abutments on one of said members, said abutments being arranged to prevent angular movement of the blade from its normal position relative to the arm, and one of said abutments being moved clear by the rocking of the blade to the trailing position to permit angular movement of the blade relative to the arm only in the direction to increase the arc of wiping.

3. In a windscreen wiper of the type wherein the blade is mounted so as to be angularly movable with respect to the radial position of the wiper arm to increase the arc of wiping by the inner end of the blade engaging a fixed member at the end of its stroke, a wiper blade and an actuating arm carrying said blade, means pivotally connecting said blade to said arm, said means comprising a housing adapted to receive the end of the arm, a pair of spaced members within the housing and resilient means acting on said members to urge them apart, means pivotally connecting said housing to said members, one of said members being fixed to the blade and the other being pivoted to the first member, whereby twisting of the blade relative to the arm causes one of said members to pivot relative to the other and the housing to pivot about one end, said housing having depending walls arranged to straddle the sides of the pivoted member normally to prevent said relative movement.

4. In a windscreen wiper of the type wherein the blade is mounted so as to be angularly movable with respect to the radial position of the wiper arm to increase the arc of wiping by the inner end of the blade engaging a fixed member at the end of its stroke, a wiper blade and an actuating arm carrying said blade and rotatable about an axis, means pivotally connecting said blade to said arm, said means comprising a housing adapted to receive the end of the arm, a pair of spaced members within said housing and resilient means acting on said members to urge them apart, means pivotally connecting said housing to said members, that one of said members nearer the axis of rotation of the arm being fixed to the blade and the other being pivoted to the first member, whereby twisting of the blade relative to the arm causes one of said members to pivot relative to the other and the housing to pivot about its end nearer to the axis of rotation of the arm, said housing having depending walls arranged to straddle the sides of the pivoted member to prevent said relative movement, and being of such a depth that they are moved clear of the pivoted member at the leading edge by the rocking of the blade to the trailing position, thus permitting the blade to swing relative to the arm in the direction to increase the arc of wiping but preventing relative swinging movement in the reverse direction.

5. In a windscreen wiper of the type wherein the blade is mounted so as to be angularly movable with respect to the radial position of the wiper arm to increase the arc of wiping by the inner end of the blade engaging a fixed member at the end of its stroke, a wiper blade and an actuating arm carrying said blade and rotatable about an axis, means pivotally connecting said blade to said arm, said means comprising a housing adapted to receive the end of the arm, a pair of spaced members within said housing and resilient means acting on said members to urge them apart, means pivotally connecting said housing to said members, that one of said members more remote from the axis of rotation of the arm being fixed to the blade and the other being pivoted to the first member, whereby twisting of the blade relative to the arm causes one of said members to pivot relative to the other and the housing to pivot about its end more remote from the axis of rotation of the arm, said housing having depending walls arranged to straddle the sides of the pivoted member to prevent said relative movement, and said housing being free to rock about its pivoted end and pivot away from the blade to move the depending walls of the housing away from the pivoted member to permit the blade to swing relative to the arm.

6. In a windscreen wiper of the type wherein the blade is mounted so as to be angularly movable with respect to the radial position of the wiper arm to increase the arc of wiping by the inner end of the blade engaging a fixed member at the end of its stroke, a wiper blade and an actuating arm carrying the said blade and rotatable about an axis, means pivotally connecting the said blade to said arm, said means comprising a housing adapted to receive the end of the arm, a pair of spaced members within the housing and resilient means acting on said members to urge them apart, means pivotally connecting said housing to said members, one of said members being fixed to the blade and the other being pivoted to the first member for transverse movement and lifting movement relative thereto, whereby twisting of the blade relative to the arm causes one of said members to pivot relative to the other and the housing to pivot transversely about its end more remote from the axis of rotation of the arm, and a protuberance on said pivoted member normally engaging in a recess in said fixed member to prevent twisting of the blade relative to the arm and said protuberances being arranged to be lifted from engagement with said recess by the lifting of the housing and the pivoted member away from the blade when the blade reaches the end of its stroke.

7. A connector for connecting a wiper blade to a wiper arm, comprising a pair of spaced members, spring means acting on said members to hold them in their normal position, means pivotally connecting together said members at a point therebetween so that the blade can twist relative to the connector by twisting one of said spaced members relative to the other so that the spring is deflected and tends to restore said members to their normal position, an abutment member of each side of the blade and movable relative to the blade, said abutment members being so arranged that one or the other normally lies in the path of the twisting movement of said spaced members and thereby prevents twisting of said spaced members relatively to each other, and being adapted to be moved out of said path so as to permit said twisting movement, by relative movement between the connector and the blade when the blade reverses its direction of movement at the end of its stroke.

8. In a windscreen wiper of the type wherein the blade is mounted so as to be angularly movable with respect to the radial position of the wiper arm to increase the arc of wiping, a wiper blade and an actuating arm carrying said blade and means pivotally connecting said blade to said arm for twisting movement relative to the radial position of said arm and for rocking movement relative to said arm to a trailing position, a pair of abutments movable with the arm arranged to straddle the blade to prevent drag on the blade from twisting the blade relative to the radial direction of the arm, said abutments being of such a depth as to be cleared by the blade on the leading side, to permit the desired twisting of the blade, by virtue of the rocking of the blade relative to the arm to a trailing position as the blade reverses its direction of movement.

9. In a windscreen wiper of the type wherein the blade is mounted so as to be angularly movable with respect to the radial positions of the wiper arm to increase the arc of wiping by the inner end of the blade engaging a fixed member at the end of its stroke, a wiper blade and an actuating arm carrying said blade, means pivotally connecting said blade to said arm for angular movement relative to the arm, spring means for normally retaining said blade and arm in a predetermined relative angular relationship, and stop means, additional to said spring means, operating between the arm and blade when the latter are in said predetermined relative position and acting to restrain angular movement of the blade from its said predetermined position relative to the arm in the direction which it tends to turn by reason of drag between the outer end of the blade and the windscreen during movement of the blade across the screen.

10. In a windscreen wiper of the type wherein the blade is mounted so as to be angularly movable with respect to the radial position of the wiper arm to increase the arc of wiping by the inner end of the blade engaging a fixed member at the end of its stroke, a wiper blade and an actuating arm carrying said blade, means pivotally connecting said blade to said arm for angular movement relative to the arm, spring means for normally retaining said blade and arm in a predetermined angular relationship, stop means additional to said spring means, operating between the arm and blade when the latter are in said predetermined relative position and acting to restrain angular movement of the blade from its said predetermined position, relative to the arm in the direction which it tends to turn by reason of drag between the outer end of the blade and the windscreen during movement of the blade across the screen, and means for reversing the direction of operation of said stop means in response to reversal of the direction of movement of the blade across the screen.

References Cited in the file of this patent

UNITED STATES PATENTS

| 2,576,809 | Rappl | Nov. 27, 1951 |
| 2,587,168 | Kessler | Feb. 26, 1952 |

FOREIGN PATENTS

| 615,192 | Great Britain | of 1949 |
| 615,500 | Great Britain | of 1949 |